No. 730,112. PATENTED JUNE 2, 1903.
S. GRIFFIN.
FRICTION CLUTCH.
APPLICATION FILED APR. 1, 1901.

NO MODEL.

Witnesses
W. S. Guest
F. B. Jarman

Inventor
S. Griffin
by C. W. Riches
his attorney

No. 730,112.

Patented June 2, 1903.

UNITED STATES PATENT OFFICE.

SAMUEL GRIFFIN, OF BATH, ENGLAND.

FRICTION-CLUTCH.

SPECIFICATION forming part of Letters Patent No. 730,112, dated June 2, 1903.

Application filed April 1, 1901. Serial No. 53,893. (No model.)

*To all whom it may concern:*

Be it known that I, SAMUEL GRIFFIN, engineer, a subject of the King of Great Britain, residing at Kingston Ironworks, Bath, in the county of Somerset, England, have invented new and useful Improvements in Friction-Clutches, (for which I have applied for a patent in Great Britain, No. 12,924, dated July 18, 1900,) of which the following is a specification.

My invention has for its object improvements in friction-clutches for automobiles, light locomotives, bicycles, and other machines; and it consists of a simple friction-clutch arrangement by which the vehicle or machine may be allowed to run free of the driving power whichever direction such power may be applied and at the same time be capable of conveying backward or forward propulsion to such vehicle or machine when so desired, thus providing a free wheel which when applied to a cycle enables the rider to back pedal as well as to pedal forward.

In order that my invention may be clearly understood and more easily carried into practice, I have appended hereunto a sheet of drawings upon which I have illustrated a friction-clutch or free wheel suitable for a cycle and from which its application to other uses will be readily understood.

Figure 1:
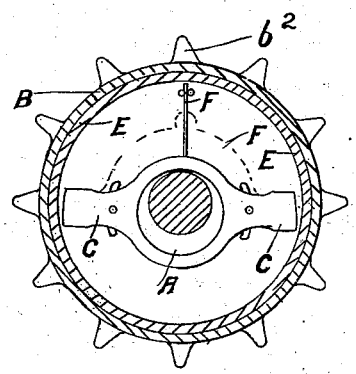
Figure 2:
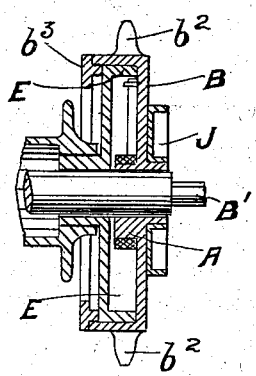
Figure 6:
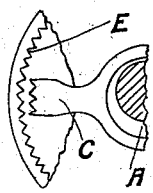
Figure 5:
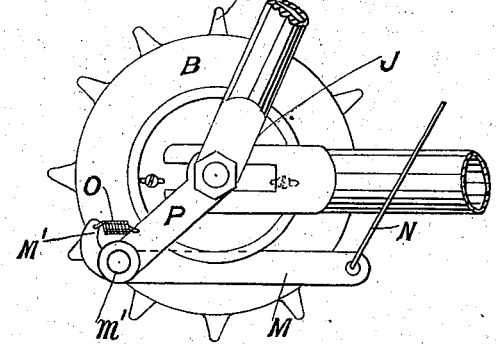
Figure 4:
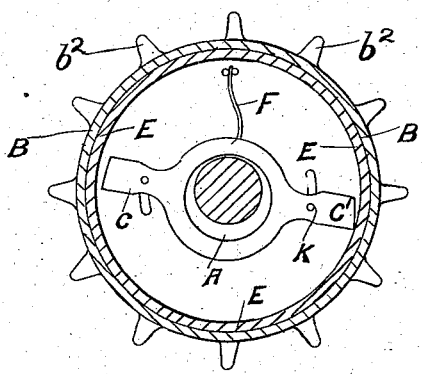
Figure 3:
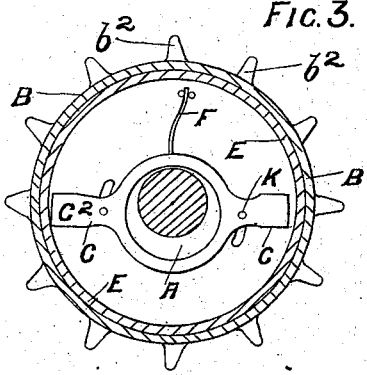

Figure 1 is a sectional elevation of the interior of the clutch shown as when running free. Fig. 2 is a section through Fig. 1. Fig. 3 is a similar sectional elevation to Fig. 1, but shown as when back pedaling. Fig. 4 is also a similar elevation to Fig. 1, but shown as when pedaling forward. Fig. 5 is an elevation showing one form of mechanism for transferring the motion. Fig. 6 is an elevation of a portion of the friction-box, showing a modification in the shape of the friction-surface.

According to this invention the eccentric A is fixed to a driving element B and surrounds a shaft B', and upon the eccentric A the double-ended pawl or friction-piece C is mounted loosely. This friction-piece C is of a length or diameter slightly less than the internal diameter of the driven element E, which surrounds it and which is mounted on or concentric with the driving element B, around which it can freely revolve.

The double-ended pawl-cam or friction-piece is retained out of action, as shown by Fig. 1, by any suitable spring, such as F, and its movement may be momentarily retarded by any suitable device, as hereinafter described, by which means its movement upon the eccentric A with regard to the driven element E causes one of the outer ends $c'$ $c^2$ to engage with or wedge against the internal edge or rim of the driven element E, by which the said driven element E is carried in the same direction as the driving element B.

Any suitable device may be provided for the momentary detention of the friction-piece C—as, for illustration, the circular ring J, which is connected to the friction-piece C by the screws K, may be retarded in its revolution by the friction-lever M, which may be operated through the cord, wire, or other connection N, by which connection the required movement is transmitted from the rider when desired.

Supposing the arrangement to be running free, as shown by Fig. 1, the action for pedaling forward is as follows: Power being transmitted, as described, to retard the movement of the friction piece or pawl C, the eccentric continuing to revolve immediately forces the corresponding outer end $c'$ of the said pawl C into contact with the internal edge or rim of the driven element E, thus causing it to revolve at the same speed and in the same direction as shown by Fig. 4. If, however, the spindle B' or box B is stopped or retarded, the driven element E will be free to revolve or continue revolving in the same direction at any speed by reason of the pawl C being relieved from contact with the internal edge or rim of the driven element E and through the medium of the spring F takes a position concentric thereto.

For "back pedaling," power, as before described, is applied to retard the pawl C, and a reverse action being brought to bear upon the driving element B the opposite end $c^2$ of the pawl C is brought into contact with the internal edge of the driven element E, thus enabling the direction in which the driven element E revolves to be reversed or retarded by back pedaling, as shown by Fig. 3. In cases where motion in one direction only is required the pawl C may be single-ended only.

In the case of the driven element E the surface may be serrated to obtain a more positive connection than that obtained by friction, as before described, the ends of the pawl C being also serrated to correspond thereto, as shown in Fig. 6.

Having now described my invention, what I claim as new, and desire to secure by Letters Patent, is—

1. In a friction-clutch, the combination of driving and driven elements mounted to revolve independently of each other, a spring-controlled element intermediate of said driving element and mounted on one element in such a position as to be capable of engaging the other element, a disk connected to the element upon which the spring-controlled element is mounted, and a friction-lever for controlling the spring-controlled element.

2. In a friction-clutch, the combination of a spindle, a driving element carried by the spindle, a spring-controlled eccentric carrying friction-pieces mounted upon the spindle, a disk connected to said eccentric through the driving element, and a driven element loosely surrounding the spindle and adapted to revolve therewith when engaged by the friction-pieces.

3. In a friction-clutch, the combination of a spindle, a disk carried by and revoluble with the spindle, another disk loosely mounted upon the spindle within the first-mentioned disk, an eccentric carried upon the inner face of the first-mentioned disk and a spring-controlled double-ended pawl mounted upon the eccentric within the disks and adapted to have its ends engage the inner disk to cause the same to revolve with the spindle.

4. In a friction-clutch, the combination of a shaft, a disk carried upon said shaft, an eccentric carried upon the inner face of said disk, a double-ended pawl mounted upon said eccentric, another disk rotatably mounted upon the shaft and within the first-mentioned disk, a spring connected to the double-ended pawl and to the first-mentioned disk and means to cause the double-ended pawl to engage the loosely-mounted disk to cause same to revolve with the shaft.

In witness whereof I have set my hand in the presence of two witnesses.

SAMUEL GRIFFIN.

Witnesses:
P. B. L. WILKES,
JAMES R. HUGHES.